United States Patent [19]

Arai

[11] Patent Number: 5,090,200
[45] Date of Patent: Feb. 25, 1992

[54] REGENERATION SYSTEM FOR PARTICULATE TRAP

[75] Inventor: Minoru Arai, Fujisawa, Japan

[73] Assignee: Isuzu Motors Limited, Tokyo, Japan

[21] Appl. No.: 492,136

[22] Filed: Mar. 13, 1990

[30] Foreign Application Priority Data

Mar. 30, 1989 [JP] Japan .................................. 1-78998

[51] Int. Cl.⁵ ................................................ F01N 3/02
[52] U.S. Cl. .......................................... 60/286; 60/289;
60/303; 55/283; 55/DIG. 30
[58] Field of Search .................... 60/286, 289, 303;
55/283, DIG. 30

[56] References Cited

U.S. PATENT DOCUMENTS

| | | | |
|---|---|---|---|
| 4,450,682 | 5/1984 | Sato | 60/303 |
| 4,562,695 | 1/1986 | Rao | 60/303 |
| 4,589,254 | 5/1986 | Kume | 60/286 |

FOREIGN PATENT DOCUMENTS

| | | | |
|---|---|---|---|
| 19908 | 2/1985 | Japan | 60/289 |
| 60-19908 | 2/1985 | Japan . | |
| 60-50211 | 3/1985 | Japan . | |

Primary Examiner—Douglas Hart
Attorney, Agent, or Firm—Staas & Halsey

[57] ABSTRACT

A regeneration system for a particulate trap provided in an exhaust pipe of an engine, determines the flow rate of regenerating air in relation to atmospheric pressure and temperature upon the regeneration. The determined flow rate is corrected on the basis of the trap inlet temperature at the time of initiation of the regeneration, and the regenerating air is controlled according to the corrected flow rate.

7 Claims, 3 Drawing Sheets

REGENERATION SYSTEM FOR PARTICULATE TRAP

CROSS-REFERENCE TO RELATED APPLICATIONS

This application is related to my U.S. application Ser. No. 07/478,951 filed Feb. 12, 1990 and U.S. application Ser. No. 07/524,466 filed May 17, 1990.

BACKGROUND OF THE INVENTION

The present invention relates to a regeneration system for a particulate trap, and in particular to a system for controlling the flow rate of air introduced upon the regeneration (combustion) of a particulate trap (hereinafter abbreviated as trap) provided in the exhaust pipe of an engine.

In prior art regeneration systems for a trap comprising a regenerating thermal source such as an electric heater or a gas oil burner, the flow rate of regenerating air into/from the regenerating thermal source is controlled to optimize the trap temperature upon the regeneration, as disclosed e.g. in Japanese Patent Application laid-open Nos. 60-19908 and 60-50211.

In order to maintain the trap temperature upon the regeneration (i.e., the regeneration temperature) at an optimum value, such systems detect the temperature of the regenerating thermal source to fix the thermal output (quantity of heat), and also control the flow rate of the regenerating air, so that a flow rate with a fixed weight (oxygen weight content) suitable for the regeneration may be supplied for the trap at all times, even though atmospheric pressure and temperature vary.

On the other hand, the average temperature of the trap upon regeneration is determined from the trap inner temperature at the time of initiation of the regeneration in view of the fact that ① since the weight of particulates accumulated in the trap at which the regeneration time has come, is considered to be almost constant, the heat value (calorific value) during the regeneration is also constant, and ② the heat capacity of the trap during the regeneration is constant.

However, such systems disclosed in the above-noted publications control the flow rate of the regenerating air regardless of the trap temperature (heat capacity) at the initiation of the regeneration, so that the trap temperature at the initiation of the regeneration varies the trap temperature upon the regeneration.

Namely, for example, in the event the temperature of the trap is high due to a high loaded engine condition or hot atmosphere immediately before the regeneration process, the average temperature of the trap upon the regeneration becomes so excessively high that the trap may be melted, while in the event the temperature of the trap is low due to a low loaded engine condition or cold atmosphere, the average temperature of the trap is so low that a suitable regeneration for the accumulated particulates can not be maintained.

SUMMARY OF THE INVENTION

Accordingly, it is an object of the present invention to provide a regeneration system for a particulate trap, wherein the temperature of the trap can be controlled to be an optimum value by controlling the flow rate of regenerating air on the basis of the trap temperature at the initiation of the regeneration.

For the achievement of the above noted object, a regeneration system for a particulate trap according to the present invention comprises; air supplying means for supplying regenerating air for said trap, sensing means for sensing atmospheric pressure provided at the atmosphere intake portion of said air supplying means, sensing means for sensing atmospheric temperature provided at the atmosphere intake portion of said air supplying means, inlet temperature sensing means for said trap provided at the inlet of said trap, and control means for determining the flow rate of said regenerating air in relation to said atmospheric pressure and temperature upon the regeneration, for correcting the determined flow rate on the basis of said inlet temperature at the time of initiation of the regeneration, and for controlling said air supplying means according to the corrected flow rate.

According to the present invention, when the time has come to execute a regeneration process as usual, control means correct the flow rate (oxygen flow rate) of regeneration air per unit time interval set in relation to the outputs of atmosphere temperature sensing means and atmosphere pressure sensing means, so that the regeneration temperature may be adequate corresponding to the output of trap inlet temperature sensing means detected at the time of initiation of the regeneration.

Namely, it is significant to read the trap inlet temperature at the time of initiation of the regeneration but it is meaningless to read the trap inlet temperature after the regeneration process has already begun, because in the latter case the combustion particulates have already been moved towards the exit of the trap.

This causes an optimum air flow rate to be provided regardless of the variation of the heat capacity of the trap at the initiation of the regeneration, resulting in an optimum regeneration without the trap being melted and without failing in the combustion of particulates.

BRIEF DESCRIPTION OF THE DRAWINGS

The present invention will now be more apparent to those skilled in the art from the attached drawings in which.

DETAILED DESCRIPTION OF THE PREFERRED EMBODIMENTS

Hereinafter, an embodiment of a regeneration system for a particulate trap according to the present invention will be described.

Figure 1:
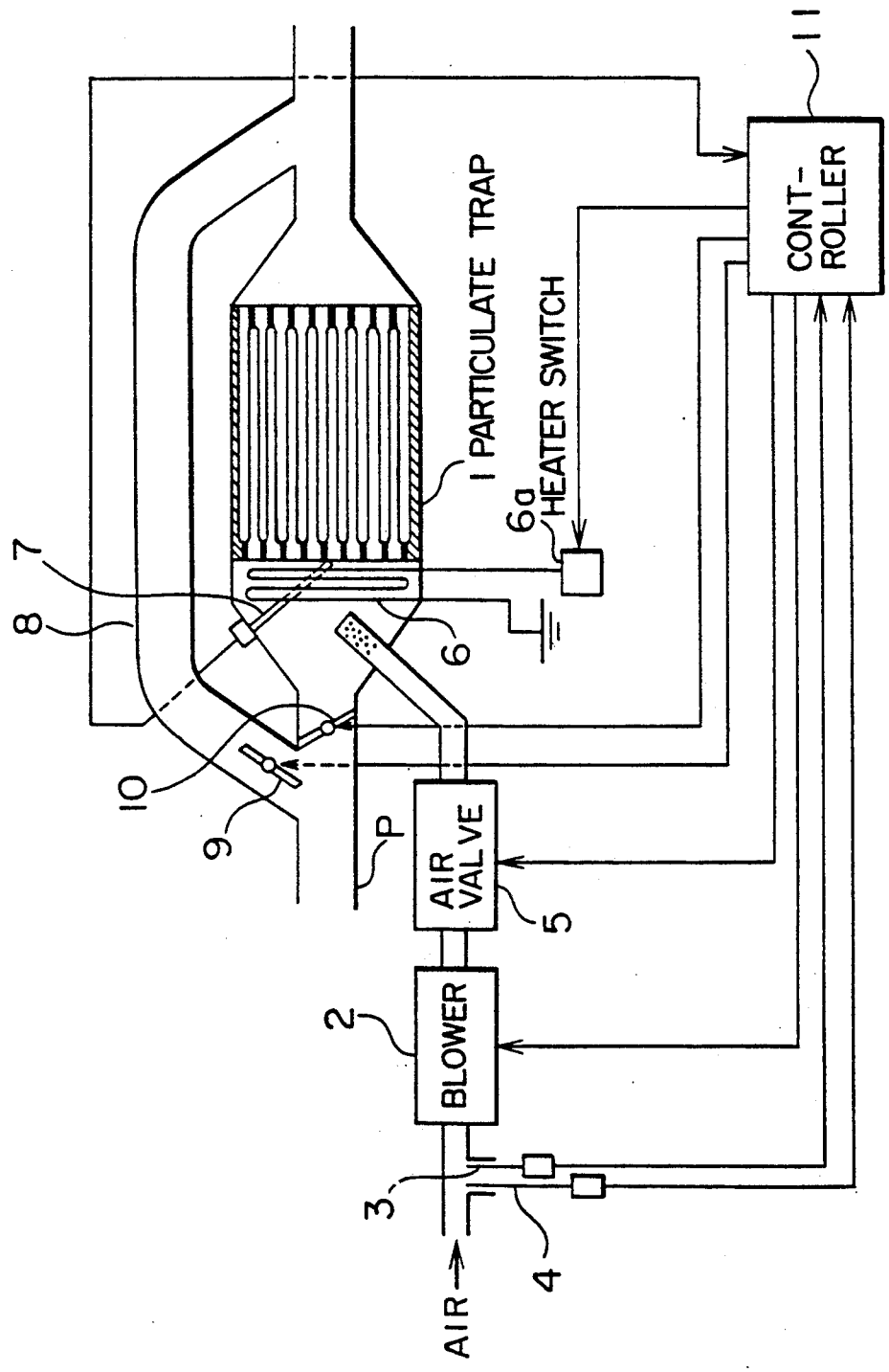
FIG. 1 is a schematic diagram of one embodiment of a regeneration system for a particulate trap according to the present invention.

FIG. 1 illustrates the arrangement of an embodiment of the present invention, in which a well-known particulate trap 1 is provided in an exhaust pipe P of an engine (not shown). A blower 2 receives, as an input, atmosphere for supplying regenerating air into the trap 1. An atmospheric pressure sensor 3 which acts as an atmospheric pressure sensing means, is provided at the intake portion of the regenerating air into the blower 2. An atmospheric temperature sensor 4 which acts as an atmospheric temperature sensing means, is also provided at the intake portion of the regenerating air into the blower 2. An air valve 5 is connected to receive the regenerating air output from the blower 2 and is transferred to the trap 1 for controlling the flow rate thereof. A heater 6 is provided at the front face of the trap 1 and is switched on/off by a heater switch 6a. A trap inlet temperature sensor 7 which acts as an inlet temperature sensing means for the trap 1, is provided at the inlet of the trap 1 to detect the inlet temperature thereof. A bypass pipe 8 is provided across the trap 1 to bypass the exhaust gas during the regeneration, a bypass valve 9 is provided in the bypass pipe 8, and a trap inlet valve 10 is provided at the inlet portion of the trap 1 in the exhaust pipe P. It is to be noted that the above-mentioned blower 2 and the heater 6 can be replaced by an air compressor and a burner respectively. The blower 2 and the air valve 5 form regenerating air supplying means.

Furthermore, a controller 11 acts as control means for controlling the regeneration (combustion) temperature of the trap 1 to be an optimum value by controlling the air valve 5 according to the outputs of the atmospheric pressure sensor 3, the atmospheric temperature sensor 4, and the trap inlet temperature sensor 7, thereby to adjust the flow rate of the regenerating air into the trap 1.

Figure 2:
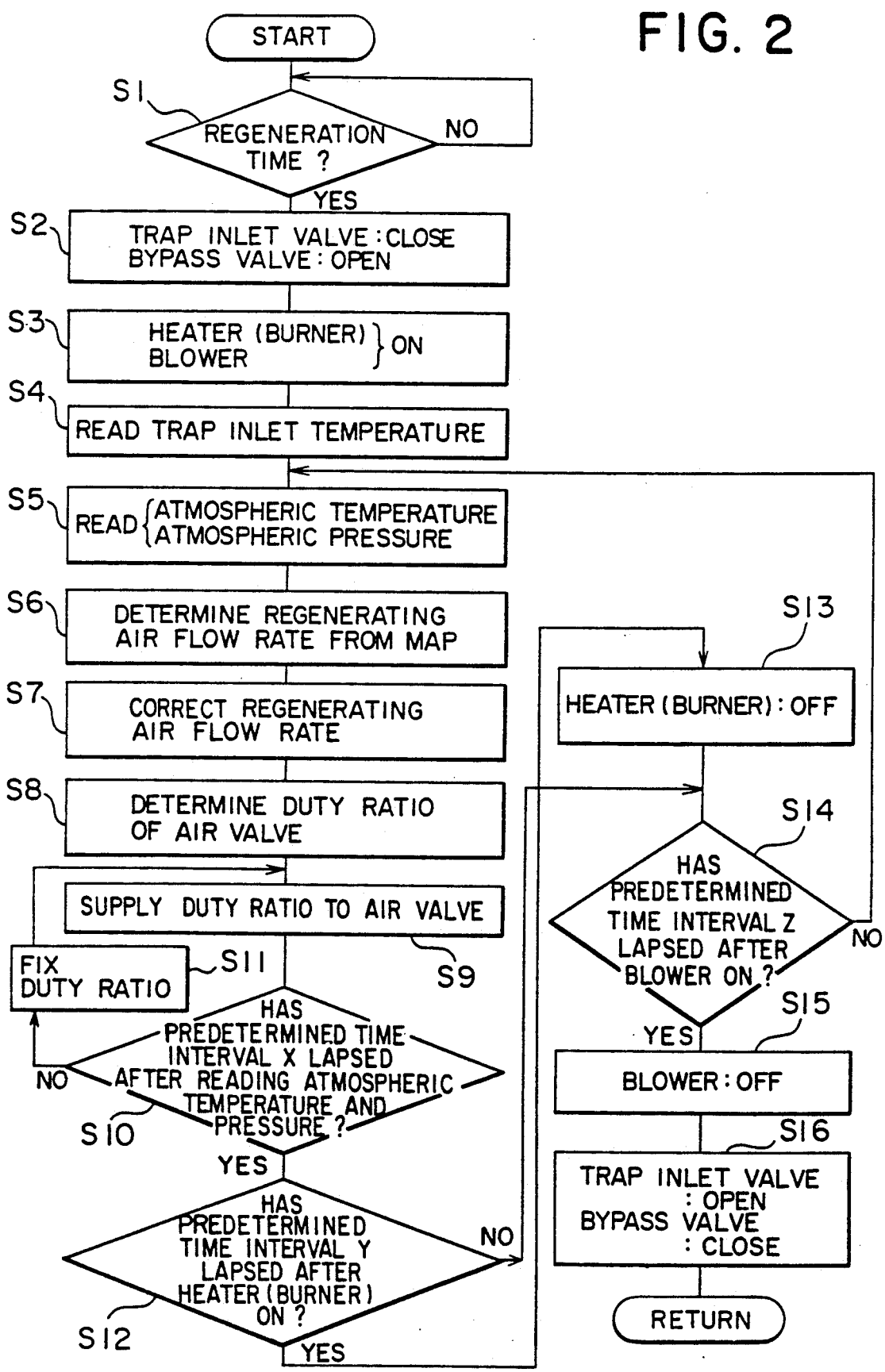
FIG. 2 is a program flow chart stored in and excecuted by controller 11 in FIG. 1 according to the present invention.

FIG. 2 shows a flow chart of a program stored in and executed by the controller 11, so that the operation of the regeneration system for a particulate trap shown in FIG. 1 will be described hereinafter with reference to the flow chart in FIG. 2.

During the conventional trapping operation for particulates, the controller 11 opens the trap inlet valve 10 and closes the bypass valve 9 to pass the exhaust gas through the trap 1.

In this state, the controller 11 checks whether or not the regeneration time has come by e.g. the detection of the pressure difference across the trap 1 as known in the prior art (Step S1 in FIG. 2). Finding that the time has come, the controller 11 serves to close the trap inlet valve 10, open the bypass valve 9 (Step S2), and switch on the heater switch 6a connected to the heater 6 and the blower 2 (Step S3) as shown in FIG. 1 so as to go into the regeneration process.

Then, the controller 11 reads the output of the trap inlet temperature sensor 7 at the initiation of the regeneration (Step S4) and the outputs of the atmospheric pressure sensor 3 and the atmospheric temperature sensor 4 (Step S5).

Figure 3:
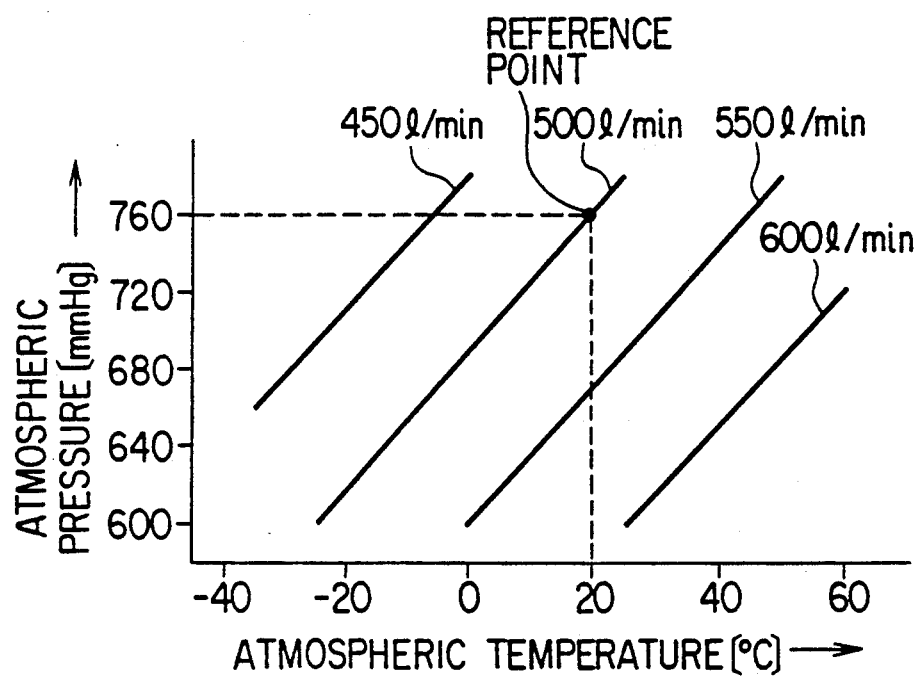
FIG. 3 is a graph of a memory map characteristic curves of atmospheric pressure versus atmospheric temperature with air flow rate per unit time interval as a parameter; and, FIG. 4 is a graph of a memory map characteristic curve for the correction of the flow rate of regenerating air according to the trap inlet temperature at the initiation of the regeneration.

Then, based on the atmospheric pressure and temperature as read, the flow rate of the regenerating air is determined from a memory map shown in FIG. 3 which is also preliminarily stored in the controller 11.

Figure 4:
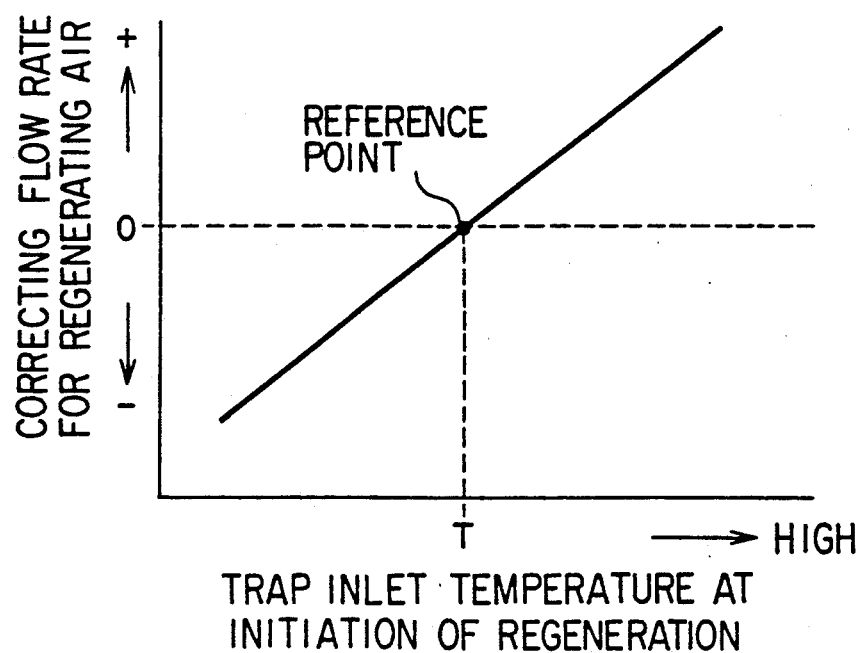

The flow rate of the regenerating air thus determined is corrected so as to increase when the trap inlet temperature is high while decreasing when the trap inlet temperature is low, in accordance with a memory map as shown in FIG. 4 which is also preliminarily stored in the controller 11 on the basis of the trap inlet temperature at the initiation of the regeneration as read in Step S4 (Step S7).

More specifically, assuming that the atmospheric pressure and the atmospheric temperature as read in Step S5 in FIG. 2 are 760 mmHg (1 atm) and 20° C. (normal temperature) respectively, the line lying at the intersection of the dotted lines drawn from the respective temperature and pressure points as shown in FIG. 3 indicates the flow rate (flow rate=500 l/min.) of the regenerating air to be controlled. The intersection assumes a reference point (temperature T). It is to be noted that each charateristic curve in FIG. 3 is experimentally plotted with a fixed air flow rate l/min (air weight/time interval) as a parameter in order to retain the regeneration of the trap 1 at a suitable condition without melting or incomplete combustion.

Then, correction is made according to the characteristic curve in FIG. 4 so that a target air flow rate may be increased over the air flow rate (500 l/min) determined at the reference point if the trap inlet temperature at this time is higher than the reference point temperature T, while the target air flow rate may be decreased below the air flow rate at the reference point if it is lower than the reference point temperature T.

The reason why the flow rate of the regenerating air is thus increased if the trap inlet temperature is higher than the reference point temperature T while being decreased if the trap inlet temperature is lower than the reference point temperature T is as follows.

When the trap temperature is high (when a necessary quantity of heat for reaching a predetermined regeneration temperature is small), the quantity of heat is removed to decrease the trap temperature by supplying a greater quantity of air to the trap 1, while when the trap temperature is low, the quantity of heat removed by such supplied air is made small by decreasing the air flow rate, whereby an optimum temperature which is an important condition for maintaining the combustion of particulates is maintained.

Returning to FIG. 2, the controller 11 determines the duty ratio of a duty solenoid (not shown) in the air valve 5 to provide the regenerating air of the corrected flow rate (Step S8), which is supplied to the duty solenoid in the air valve 5 (Step S9). Then, the duty ratio is fixed (Step S11) until a predetermined time interval X has lapsed after the atmospheric pressure and temperature were given to the controller 11 (Step S10 in FIG. 2). This is because when the duty ratio is not frequently changed a more stable control is provided.

Subsequently, the controller 11 checks whether or not a predetermined time interval Y has lapsed from the time the heater 6 was switched on (Steps S12). As a result, if the predetermined time interval has lapsed, then the heater 6 is switched off (Step S13) while if not, the program will go to Step 14 in which the controller 11 checks whether or not a predetermined time interval Z which is set longer that the predetermined time interval Y set for the heater 6 has lapsed from the time the blower 2 was switched on (Steps S14). As a result, if the predetermined time interval Z has lapsed, then the blower 2 is switched off (Step S15) while if not, the program will return to Step S5 for the repetition of the above Steps S5 to S14.

If both of the predetermined time intervals Y and Z have lapsed in sequence, which means that the regeneration process has ended, then the trap inlet valve 10 is opened and the bypass valve 9 is closed (Step S16) whereby the program will return to the conventional particulate trapping mode.

While a number of alternatives and modifications have been discussed above, it will be appreciated that the invention encompasses all forms and variations within the scope of the appended claims.

What is claimed:

1. A regeneration system for a particulate trap having an inlet and provided in an exhaust pipe of an engine, comprising:
air supplying means for supplying regenerating air for said trap, said air supplying means having an atmosphere intake portion;
sensing means for sensing atmospheric pressure provided at the atmosphere intake portion of said air supplying means;
sensing means for sensing atmospheric temperature provided at the atmosphere intake portion of said air supplying means;
inlet temperature sensing means for said trap provided at the inlet of said trap; and
control means for determining the flow rate of said regenerating air based on the sensed atmospheric pressure and temperature during regeneration, for correcting the determined flow rate on the basis of the sensed inlet temperature at the time of initiation of the regeneration, and for controlling said air supplying means according to the corrected flow rate.

2. A regeneration system for a particulate trap provided in an exhaust pipe of an engine according to claim 1, wherein said air supplying means comprises a blower and an air valve, and wherein said control means controls the duty ratio of said air valve according to the corrected flow rate.

3. A regeneration system for a particulate trap provided in an exhaust pipe of an engine according to claim 2, wherein said control means stores therein a memory map for determining the flow rate of said regenerating air and for correcting the determined flow rate.

4. A regeneration system for a particulate trap provided in an exhaust pipe of an engine according to claim 3, wherein said control means fixes said duty ratio until a predetermined time interval has lapsed after said control means read said atmospheric temperature and pressure.

5. A regeneration system for a particulate trap provided in an exhaust pipe of an engine according to claim 4, further comprising a heater, said control means switching on said heater and said blower at the initiation of the regeneration and switching off said heater and said blower after respective predetermined time intervals have lapsed.

6. A regeneration system for a particulate trap provided in an exhaust pipe of an engine according to claim 5, further comprising:
an inlet valve provided at the front of said trap in the exhaust pipe; and
a bypass valve provided in a bypass pipe across said trap, said control means closing said inlet valve and opening said bypass valve when the regeneration of said trap is initiated, while opening said inlet valve and closing said bypass valve when the regeneration of said trap is completed.

7. A regeneration system for a particulate trap having an inlet and provided in an exhaust pipe for an engine, comprising:
air supplying means for supplying air for said trap, said air supplying means having an intake portion;
a pressure sensor positioned to sense atmospheric pressure at the intake portion of said air supplying means, for providing a pressure signal;
a first temperature sensor positioned to sense the temperature at the intake portion of said air supplying means, for providing a first temperature signal;
a second temperature sensor positioned to sense the temperature at the inlet of the trap, for providing a second temperature signal; and
control means, coupled to said air supplying means, said pressure sensor and said first and second temperature sensors, for determining a flow rate of the air supplied by said air supplying means based on the pressure signal and the first temperature signal during regeneration, and for determining a corrected flow rate based on the second temperature signal at the time regeneration is begun, and for controlling said air supplying means according to the determined corrected flow rate.

* * * * *